United States Patent
Utsubo et al.

(10) Patent No.: US 7,492,104 B2
(45) Date of Patent: Feb. 17, 2009

(54) HIGH PRESSURE DISCHARGE LAMP

(75) Inventors: Atsushi Utsubo, Toyonaka (JP); Hiroshi Nohara, Nishinomiya (JP); Yukiya Kanazawa, Osaka (JP)

(73) Assignee: Panasonic Corporation, Osaka (JP)

( * ) Notice: Subject to any disclaimer, the term of this patent is extended or adjusted under 35 U.S.C. 154(b) by 197 days.

(21) Appl. No.: 11/197,733

(22) Filed: Aug. 3, 2005

(65) Prior Publication Data

US 2005/0269966 A1 Dec. 8, 2005

Related U.S. Application Data

(63) Continuation of application No. PCT/JP2005/004354, filed on Mar. 11, 2005.

(30) Foreign Application Priority Data

Mar. 30, 2004  (JP) ............................. 2004-100799

(51) Int. Cl.
H01J 7/44 (2006.01)
(52) U.S. Cl. .............................. 315/58; 315/59; 315/73
(58) Field of Classification Search ................ 315/289, 315/DIG. 2, DIG. 5, 290 R, 291, 312, 314, 315/56–63, 73–75, 94–107, 204, 241 R, 243, 315/309; 362/27, 101
See application file for complete search history.

(56) References Cited

U.S. PATENT DOCUMENTS

| | | | | |
|---|---|---|---|---|
| 4,984,344 A | * | 1/1991 | Wells | 29/261 |
| 4,987,344 A | * | 1/1991 | Zaslavsky et al. | 315/59 |
| 5,138,231 A | * | 8/1992 | Iida et al. | 315/73 |
| 5,336,974 A | * | 8/1994 | Luijks et al. | 315/58 |
| 5,389,856 A | * | 2/1995 | Luijks et al. | 315/58 |
| 5,420,479 A | * | 5/1995 | Iida et al. | 315/73 |
| 6,034,477 A | * | 3/2000 | Peeters et al. | 315/57 |
| 6,437,516 B2 | * | 8/2002 | Hakuta et al. | 315/244 |

FOREIGN PATENT DOCUMENTS

| | | |
|---|---|---|
| JP | 54-155673 | 12/1979 |
| JP | 55-124941 | 9/1980 |
| JP | 57-92747 A | 6/1982 |
| JP | 58-038451 A | 3/1983 |
| JP | 59-180955 A | 10/1984 |

(Continued)

Primary Examiner—Douglas W Owens
Assistant Examiner—Jimmy T Vu
(74) Attorney, Agent, or Firm—McDermott Will & Emery LLP

(57) ABSTRACT

A high pressure discharge lamp includes an outer tubular bulb whose inner space is exhausted to a vacuum; an arc tube contained in the outer tubular bulb; and a voltage reducing switching element for reducing a voltage applied to the arc tube. The voltage reducing switching element includes a heat sensitive switching element and a starting-voltage reducing element which are connected in series. During a period in which the heat sensitive switching element has a predetermined temperature or higher, the heat sensitive switching element is closed to electrically connect the arc tube and the voltage reducing switching element in parallel, so that the starting-voltage reducing element is operated. During a period in which the heat sensitive switching element has a temperature lower than the predetermined temperature, the heat sensitive switching element is opened so that the starting-voltage reducing element is not operated.

6 Claims, 4 Drawing Sheets

FOREIGN PATENT DOCUMENTS

| | | |
|---|---|---|
| JP | 59-196554 | 11/1984 |
| JP | 61-264656 | 11/1986 |
| JP | 01-101125 A | 4/1989 |
| JP | 2000-501563 A | 2/2000 |
| JP | 2001-093473 A | 4/2001 |

* cited by examiner at low temperature (a)    at high temperature (b)

at low temperature (a)    at high temperature (b)

HIGH PRESSURE DISCHARGE LAMP

REFERENCE TO RELATED APPLICATION

This Application is a continuation of International Application No. PCT/JP2005/004354, whose international filing date is Mar. 11, 2005, which in turn claims the benefit of Japanese Application No. 2004-100799 filed on Mar. 30, 2004, the disclosures of which Applications are incorporated by reference herein. The benefit of the filing and priority dates of the International and Japanese Applications is respectfully requested.

TECHNICAL FIELD

The present invention relates to a high pressure discharge lamp, such as a metal halide lamp.

BACKGROUND ART

Recently, metal halide lamps have been actively developed and promoted, using a tube made of translucent polycrystalline alumina ceramic (PCA) in place of quartz as an arc tube material. Although quartz has a heat resistance up to about 1,000° C., the PCA tube has a higher heat resistance up to about 1,200° C., thereby allowing the tube wall load to be set in a higher range. Therefore, the use of the PCA tube makes it possible to provide a metal halide lamp with a higher lamp efficiency. At first, metal halide lamps (ceramic metal halide lamps) using the PCA tube were developed and commercialized for indoor lighting applications, such as in shops, which require a high color rendering. Recently, high efficiency metal halide lamps have been under development for general outdoor lighting applications.

With respect to high efficiency metal halide lamps for outdoor lighting applications using a conventional quartz arc tube, there has been a proposal to use, as light emitting substances, a combination of sodium halide (NaX) and a halide of a lanthanoid rare-earth metal, such as cerium halide ($CeX_3$) and praseodymium halide ($PrX_3$), which emit light whose spectrum is in a wavelength region of high spectral luminous efficiency (see Japanese Laid-Open Patent Publication No. Sho 57-92747, for example).

Meanwhile, with regard to a recently developed ceramic metal halide lamp, there has been a proposal to use cerium iodide ($CeI_3$) and sodium iodide (NaI) as light emitting substances. This metal halide lamp has a high efficiency, for example, 115 lm/W with a 300 W type. It also has a sufficient color rendering for outdoor lighting, with a color rendering index Ra of 70 and a rated life time of 12,000 hours.

Also, a conventional metal halide lamp is structured such that its arc tube is contained in an outer tubular bulb of, for example, a drop shape, and that an inert gas such as nitrogen ($N_2$) is sealed in the outer tubular bulb. The arc tube is held by stem leads and the like in the outer tubular bulb.

A higher efficiency ceramic metal halide lamp using the above-mentioned light emitting substances ($CeI_3$, NaI) has also been proposed (see Japanese Unexamined Patent Publication No. 2000-501563, for example). In this metal halide lamp, the tubular shape parameter (the ratio of the electrode interspacing Le to the internal diameter $\phi i$ of the central tubular part) is greater than 5, and the arc tube is relatively long and narrow. Also, the molar ratio of the light emitting substances: $NaI/CeI_3$ is 3 to 25, and the tube wall load (we) is set to 30 W/cm² or lower. This construction provides a high lamp efficiency of 130 lm/W with a 150 W type, and a color rendering of Ra 53, for example.

DISCLOSURE OF INVENTION

Problem that the Invention is to Solve

In a conventional metal halide lamp, an inert gas is sealed in the space inside the outer tubular bulb, as described above. However, if the PCA tube is held in the outer tubular bulb with the inert gas sealed therein, heat conduction loss from the outer wall of the arc tube increases, and the resultant decrease in the tube wall temperature (Tw) causes a reduction in the vapor pressure of the light emitting substance inside the tube. As a result, it becomes difficult to achieve the object of enhancing lamp efficiency. In an attempt to address this problem, the present inventors changed the pressure of the inert gas sealed in the outer tubular bulb from the commonly used pressure of about 30 kPa to a vacuum (e.g., 1 Pa or lower).

However, they found that in the above-mentioned ceramic metal halide lamp, an arc discharge occurs in the outer tubular bulb during a lamp life test under certain conditions. For example, in cases the metal halide lamp is operated by means of an electronic ballast and a starting voltage of about 5 kV is applied to the arc tube to start the metal halide lamp, an arc discharge occurs between the stem leads. Occurrence of an arc discharge may cause the outer tubular bulb to break on rare occasion. In order to commercialize ceramic metal halide lamps, prevention of such an arc discharge is desired.

Means for Solving the Problem

The present invention relates to a high pressure discharge lamp including: an outer tubular bulb whose inner space is exhausted to a vacuum; an arc tube contained in the outer tubular bulb; and a voltage reducing switching element for reducing a voltage applied to the arc tube. The voltage reducing switching element comprises a heat sensitive switching element and a starting-voltage reducing element which are connected in series. During a period in which the heat sensitive switching element has a predetermined temperature or higher, the heat sensitive switching element is closed to electrically connect the arc tube and the voltage reducing switching element in parallel, so that the starting-voltage reducing element is operated. During a period in which the heat sensitive switching element has a temperature lower than the predetermined temperature, the heat sensitive switching element is opened so that the starting-voltage reducing element is not operated.

The arc tube can be fixed in the outer tubular bulb by a first lead and a second lead which supply the voltage applied to the arc tube. In this case, the voltage reducing switching element can be fixed to at least one of the first lead and the second lead.

Effects of the Invention

According to the present invention, particularly when a high pressure discharge lamp of high temperature fails during lamp operation, the starting voltage applied to the arc tube can be reduced to a level at which an arc discharge does not occur in the outer tubular bulb. It is therefore possible to prevent occurrence of an arc discharge in the outer tubular bulb in a lamp life test.

BEST MODE FOR CARRYING OUT THE INVENTION

Referring to FIGS. 1 to 7, embodiments of the present invention are described below.

Figure 1:
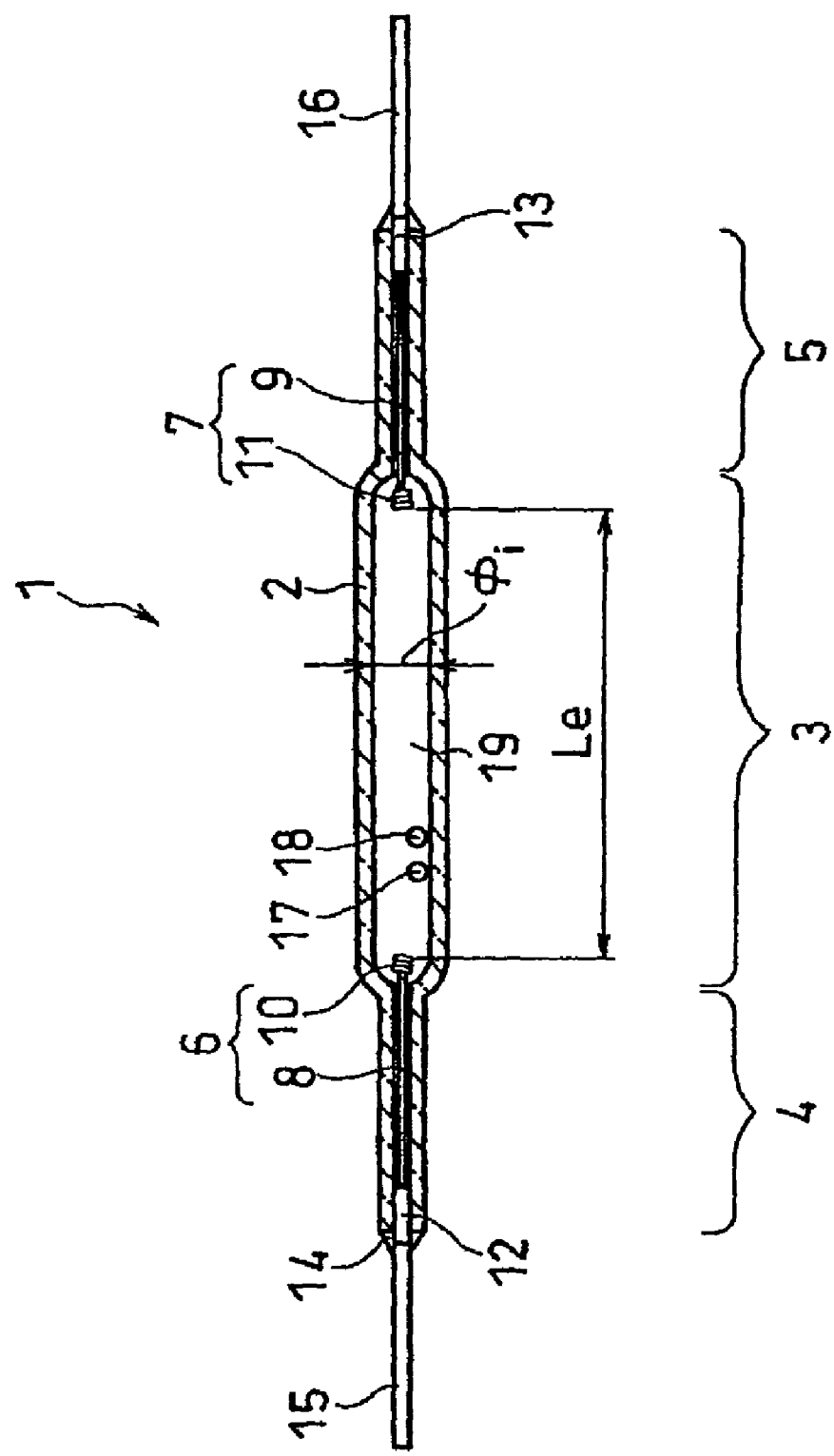
FIG. 1 is a side view of an arc tube of a 150 W metal halide lamp according to one embodiment of the present invention, in which a luminous vessel is sectionally illustrated in order to show its internal structure.

FIG. 1 is a side view of an arc tube 1 of a 150 W metal halide lamp according to one embodiment of the present invention, in which a luminous vessel 2 is sectionally illustrated in order to show its internal structure.

The luminous vessel 2 of the arc tube 1 has a central tubular part 3, which forms a discharge space 19, and side tubular parts 4 and 5, which extend from opposite ends of the central tubular part 3. The central tubular part 3 and the side tubular parts 4 and 5 are sintered integrally. The luminous vessel 2 is made of, for example, a translucent polycrystalline alumina ceramic (PCA) material.

The side tubular parts 4 and 5 contain electrodes 6 and 7, respectively. The electrode 6 or 7 comprises an electrode rod 8 or 9 made of tungsten, and a coil 10 or 11 that is made of tungsten and fixed to one end of the electrode rod 8 or 9. These ends of the electrode rods 8 and 9 are positioned in the discharge space.

The other end of the electrode rod 8 or 9 is connected to one end of a current supplier 12 or 13 made of conductive cermet. The current supplier 12 or 13 extends in the hollow of the side tubular part 12 or 13, and the other end of the current supplier 12 or 13 is connected to one end of an electrode lead 15 or 16. As the conductive cermet constituting the current suppliers 12 and 13, an $Al_2O_3$—Mo type material is used, for example. Also, niobium (Nb) or the like is used for the electrode leads 15 and 16.

The opening ends of the side tubular parts 4 and 5, from which the electrode leads 15 and 16 extend, are sealed with glass frit 14, so that the discharge space 19 is sealed gastightly. As the glass frit, for example, $Dy_2O_3$—$Al_2O_3$—$SiO_2$ type glass is used. In view of suppressing the erosion of the glass frit 14 by a light emitting substance 17 during the operation of the metal halide lamp, it is preferable to fill the glass frit 14 up to the joint of the current supplier 12 or 13 with the electrode rod 8 or 9.

The discharge space 19 of the arc tube 1 has the light emitting substance 17 sealed therein. As the light emitting substance 17, metal halide and sodium are used, for example. Although conventional metal halide lamps use cerium iodide ($CeI_3$) and sodium iodide (NaI) as the light emitting substance 17, it is preferable in the present invention to use praseodymium iodide ($PrI_3$) and sodium iodide (NaI) as the light emitting substance 17. When the former iodides are used, the color of light emitted by the lamp tends to be shifted to the green region. However, the use of the latter iodides makes it possible to improve the color of light emitted by the lamp. Also, the discharge space 19 has mercury (Hg) 18 that is sealed therein as a buffer substance. The discharge space 19 further has xenon (Xe) or argon (Ar) that is sealed therein as a buffer/auxiliary-starting gas.

Figure 2:
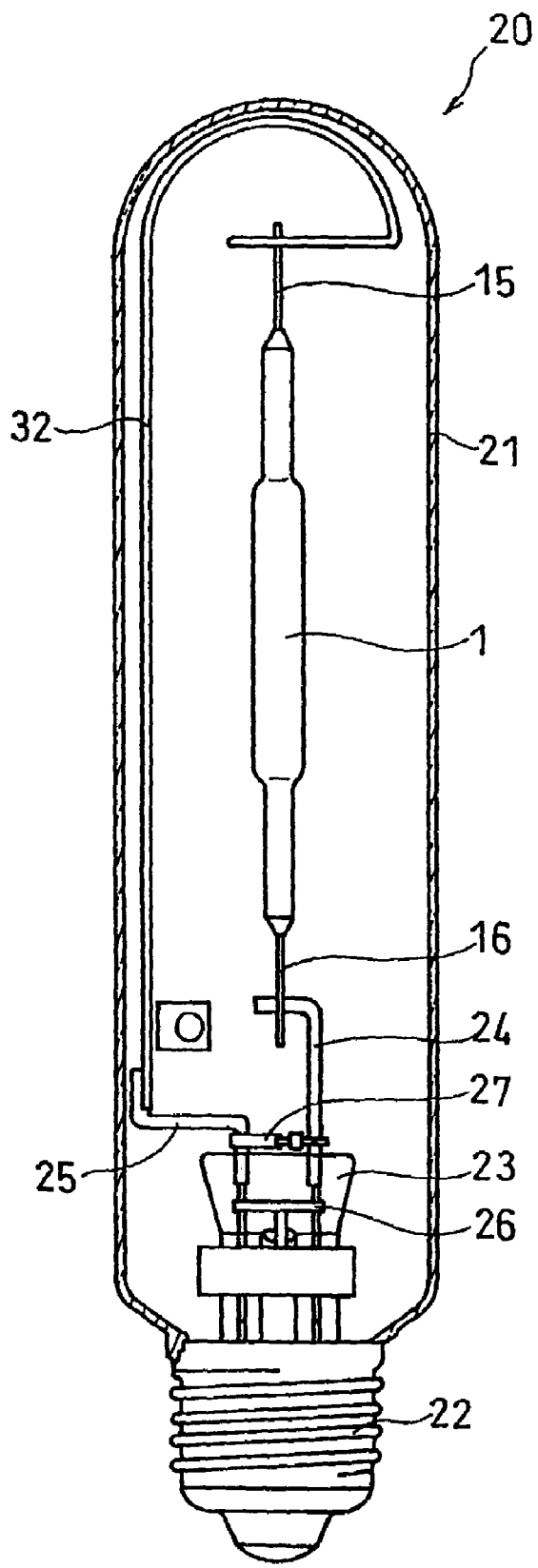
FIG. 2 is a front view of an exemplary 150 W metal halide lamp having the arc tube of FIG. 1, in which an outer tubular bulb is sectionally illustrated in order to show its internal structure.

FIG. 2 is a front view of an exemplary 150 W metal halide lamp having the arc tube 1 of FIG. 1, in which an outer tubular bulb 21 is sectionally illustrated in order to show its internal structure.

A metal halide lamp 20 includes the outer tubular bulb 21 whose inner space is exhausted to a vacuum, the arc tube 1 contained in the outer tubular bulb 21, and a voltage reducing switching (VRS) element 27 that reduces the voltage applied to the arc tube 1.

The outer tubular bulb 21 is made of a material such as hard glass. The ends of the outer tubular bulb 21 are tapered, and a base 22 is fitted to one end thereof. The lower electrode lead 16 extending from the side tubular part of the arc tube 1 is fixed and electrically connected to a stem lead 24, which is partially sealed in a stem glass 23 protruding from the above-mentioned end of the outer tubular bulb 21. The upper electrode lead 15 is fixed and electrically connected to a supporting lead 32, which extends from a stem lead 25 partially sealed in the stem glass 23. A getter ring 26 made of barium (Ba) is sealed in the stem glass 23 while being insulated from the electrode lead 15 and the electrode lead 16.

In the case of, for example, the 150 W metal halide lamp 20 using the arc tube made of a PCA material (PCA tube), the arc tube 1 is preferably long and narrow. Such an example is one in which the distance Le between the electrodes 6 and 7 is 32 mm, the internal diameter ϕi of the central tubular part 3 is 4 mm, and the tubular shape parameter Le/ϕi is 8.

Also, in the case of the above-mentioned arc tube 1, it is preferred, for example, that the amount of the light emitting substances 17 ($PrI_3$, NaI) sealed therein be 9 mg, the composition ratio: NaI/$PrI_3$ of the light emitting substances 17 be 10, the amount of the mercury 18 sealed therein be 0.7 mg, and the xenon pressure be about 25 kPa.

In operating the 150 W metal halide lamp 20 that has not been started, a high-frequency starting voltage of about 5 kV with a frequency of 80 to 400 kHz, for example, about 100 kHz, is applied for about 50 msec per second (50 msec ON/950 msec OFF) until the metal halide lamp 20 is started. When the metal halide lamp 20 is subjected to a life test, an arc discharge occurs in the outer tubular bulb 21 if the metal halide lamp 20 has no voltage reducing switching element. In the metal halide lamp 20 with the structure as illustrated in FIG. 2, an arc discharge occurs particularly between the stem leads 24 and 25 that are partially sealed in the stem glass 23, which may results in breakage, etc., of the outer tubular bulb 21, although on rare occasion.

Such an arc discharge is probably caused by re-application of the starting voltage to the arc tube 1 of high temperature when the metal halide lamp 20 fails during operation with the gas pressure inside the outer tubular bulb 21 being higher than 1 Pa.

In the absence of gas leakage into the outer tubular bulb 21, application of the starting voltage to the arc tube 1 of the failed metal halide lamp 20 does not result in occurrence of an arc discharge. Also, even in the event of gas leakage into the outer tubular bulb 21, if the arc tube 1 is in a low temperature condition, application of the starting voltage does not induce an arc discharge.

The gas pressure inside the outer tubular bulb 21 is probably increased by the following reasons: cracking of the arc tube 1 causes the Xe gas sealed in the arc tube 1 to leak in the outer tubular bulb 21; or, defective sealing of the stem leads 24 and 25 or microcracks of the outer tubular bulb 21 cause outside air to leak in. For example, when the metal halide lamp 20 fails during operation, the arc tube 1 becomes cracked due to thermal stress upon cooling, thereby causing leakage of the Xe gas. Also, with the gas pressure inside the outer tubular bulb 21 being high, the metal halide lamp 20 can be started when it cools, but it may fail during lamp operation.

It is noted that conventional metal halide lamps in which about 30 kPa nitrogen is sealed in the outer tubular bulb 21 are free from such an arc discharge. This indicates that if the gas pressure inside the outer tubular bulb 21 is 30 kPa or higher, application of the starting voltage to the arc tube 1 of high temperature after failure does not result in occurrence of an arc discharge.

In cases where the gas pressure inside the outer tubular bulb 21 is in the range of 1 Pa to 30 kPa, an arc discharge occurs in the outer tubular bulb 21, because the gas ionization is increased by thermo electrons. This phenomenon is dependent on the so-called Paschen's law. The probability of occurrence of an arc discharge in the outer tubular bulb 21 becomes particularly high when the gas pressure inside the outer tubular bulb 21 is 5 kPa to 10 kPa.

Also, only when the metal halide lamp 20 has high temperature, an arc discharge occurs in the outer tubular bulb 21. This is because high-temperature components such as the stem leads 24 and 25 release thermo electrons, thereby causing an increase in electron concentration in an early stage and therefore an increase in ionization frequency.

In the arc tube 1 of the metal halide lamp 20 of high temperature after failure, the vapor pressure in the discharge space 19 is high. Thus, even if a starting voltage of 5 kV level is applied thereto, it is difficult to restart it. In order to efficiently restart it, a cooling time of 5 to 10 minutes is necessary for lowering the vapor pressure. Accordingly, during the period the metal halide lamp 20 of high temperature after failure is not operated, it is desirable to reduce the high-frequency starting voltage to a level at which an arc discharge does not occur.

The voltage reducing switching (VRS) element 27 according to the present invention performs the function of reducing the high-frequency starting voltage applied to the arc tube 1 of high temperature down to a level at which an arc discharge does not occur. The operations of the metal halide lamp 20 equipped with the VRS element 27 are detailed below.

Figure 3:
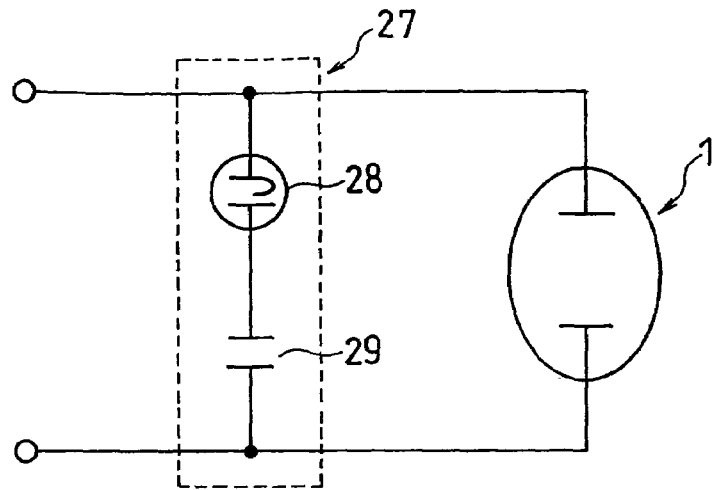
FIG. 3 is a circuit diagram including a VRS element and an arc tube according to the present invention.

FIG. 3 shows a circuit diagram including the VRS element 27 and the arc tube 1. The VRS element 27 comprises a heat sensitive switching element 28 and a starting-voltage reducing element 29 that are connected in series. The VRS element 27 is designed such that when the heat sensitive switching element 28 has a predetermined temperature or higher, the heat sensitive switching element 28 closes to electrically connect the arc tube 1 and the voltage reducing switching element 29 in parallel. As a result, the starting-voltage reducing element 29 is operated, so that the high-frequency starting voltage applied to the arc tube 1 is reduced to a level at which an arc discharge does not occur.

On the other hand, if the heat sensitive switching element 28 has a temperature lower than the predetermined temperature, the heat sensitive switching element 28 is designed to open. As a result, the starting-voltage reducing element 29 is not operated, so that the high-frequency starting voltage is applied to the arc tube 1 without being reduced.

The heat sensitive switching element 28 may be, for example, a bimetal element composed of two kinds of metal plates with different thermal expansion rates that are bonded together, or a temperature sensitive lead switch that is turned on at a predetermined temperature or higher. Also, the starting-voltage reducing element 29 may be, for example, a capacitor such as a ceramic capacitor, or a surge absorber element.

The temperature sensitive lead switch comprises a lead switch, a magnet that supplies a magnetic flux to the lead switch, and temperature sensitive ferrite jointed to the magnet. The saturated magnetic flux density of the temperature sensitive ferrite decreases sharply around the Curie temperature. The temperature sensitive ferrite performs the function of controlling the amount of magnetic flux supplied from the magnet to the lead switch by temperature, and the ON/OFF of the lead switch is controlled by change in the amount of magnetic flux.

Figure 4:
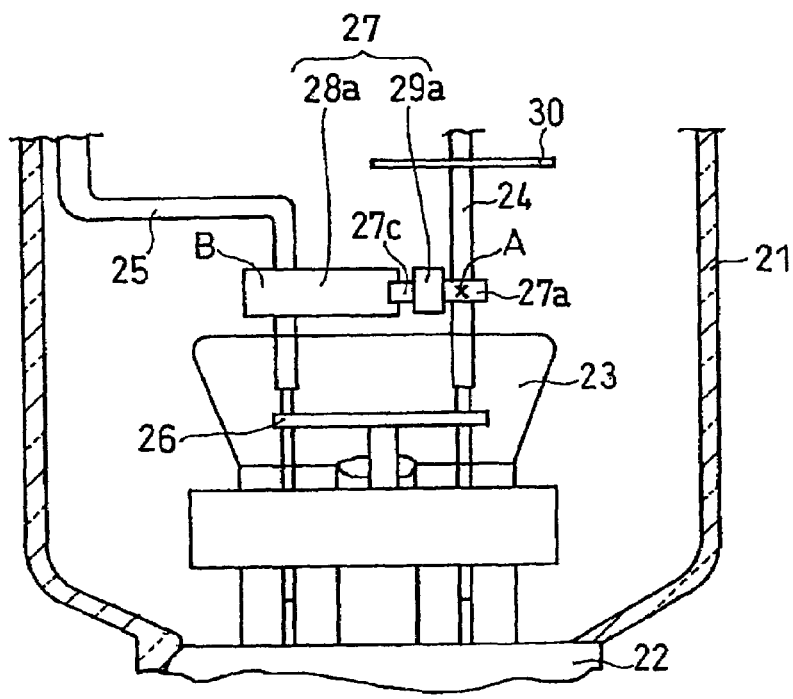
FIG. 4 is an enlarged view of the main part of the metal halide lamp of FIG. 2, in which a bimetal element is used as a heat sensitive switching element and a ceramic capacitor is used as a starting-voltage reducing element.

FIG. 4 is an enlarged view of the main part of the metal halide lamp 20 of FIG. 2, in which the heat sensitive switching element 28 is a bimetal element 28*a* and the starting-voltage reducing element 29 is a ceramic capacitor 29*a*. The bimetal element 28*a* and the ceramic capacitor 29*a* are connected in series via a connection lead 27*c*. One terminal of the ceramic capacitor 29*a* is connected to the stem lead 24 via a connection lead 27*a*, and the joint of the connection lead 27*a* and the stem lead 24 constitutes a fixed terminal A. In FIG. 4, the fixed terminal A is positioned on a part of the stem lead 24 near the stem glass 23, but the position of the fixed terminal A is not to be limited thereto.

Figure 5:
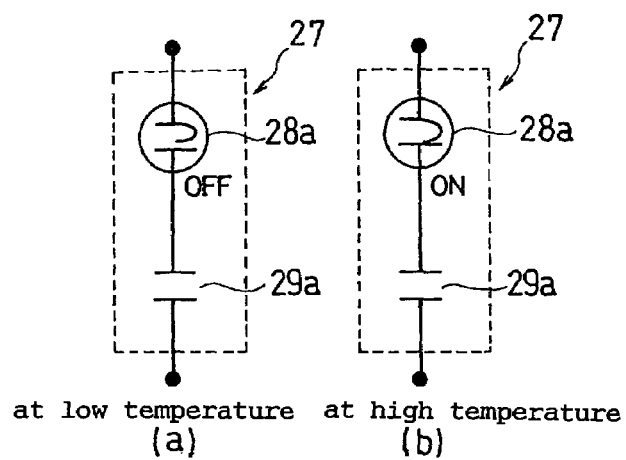
FIG. 5 has circuit diagrams showing the states of the VRS element of FIG. 4 at low temperature (a) and high temperature (b)

Meanwhile, one end of the bimetal element 28*a* functions as a movable terminal B. For example, in a low temperature condition of less than 100° C., the movable terminal B of the bimetal element 28*a* is positioned away from the stem lead 25, with a gap formed between the movable terminal B and the stem lead 25. FIG. 5(*a*) shows a circuit diagram of the VRS element 27 in such a state. If the temperature of the bimetal element 28*a* rises to 100° C. or higher, deformation of the bimetal element 28*a* brings the movable terminal B into contact with the stem lead 25, so that the movable terminal B is electrically connected to the stem lead 25. FIG. 5(*b*) shows a circuit diagram of the VRS element 27 in such a state. Of course, the connecting positions of the bimetal element 28*a* and the ceramic capacitor 29*a* may be reversed such that the fixed terminal A is provided on the stem lead 25 and the movable terminal B is provided on the stem lead 24.

The capacity of the ceramic capacitor 29*a* may be set such that the high-frequency starting voltage can be reduced from the normal value down to a level at which an arc discharge does not occur in the outer tubular bulb 21 when the movable terminal B is connected to the stem lead 25. It is preferred that the capacity of the ceramic capacitor 29*a* be, for example, 100 to 5,000 pF. If the capacity is less than 100 pF, the starting voltage may not be sufficiently reduced. Also, if the capacity exceeds 5,000 pF, the metal halide lamp 20 may exhibit a malfunction, such as flicker, during lamp operation.

From the viewpoint of preventing the ceramic capacitor 29*a* from being heated by the radiant heat from the arc tube 1 during lamp operation in the above-described construction, it is preferred, for example, to attach a shielding plate 30 to the stem lead 24. Ceramic is suited as the material of the shielding plate 30.

The operations from the failure of the metal halide lamp 20 to the restart of the metal halide lamp 20 by the VRS element 27 are as follows. First, the VRS element 27 of the metal halide lamp 20 that failed during the steady-state operation is in a high temperature condition where the bimetal temperature (Tb) is, for example, about 400° C., so that the movable terminal B is connected to the stem lead 25. Thus, due to the function of the ceramic capacitor 29a of the VRS element 27 connected to the arc tube 1 in parallel, the high-frequency starting voltage is reduced. It is therefore possible to reliably prevent an arc discharge from occurring in the outer tubular bulb 21 even if the gas pressure in the outer tubular bulb 21 has risen to a level that induces an arc discharge in a life test of the metal halide lamp 20.

Then, after the lapse of a predetermined cooling time, the temperature (Tb) of the bimetal element 28a lowers to, for example, about 100° C., so the movable terminal B moves to a position away from the stem lead 25. As a result, the normal high-frequency starting voltage is applied to the arc tube 1 without being reduced, so that the metal halide lamp 20 can be promptly restarted.

Figure 6:
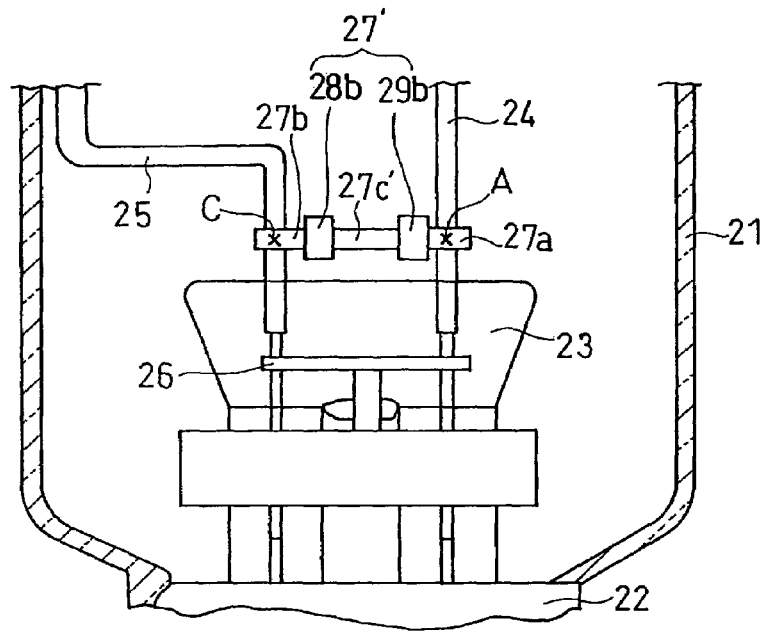
FIG. 6 is an enlarged view of the main part of the metal halide lamp of FIG. 2, in which a temperature sensitive lead switch is used as the heat sensitive switching element and a surge absorber element is used as the starting-voltage reducing element.
Figure 7:
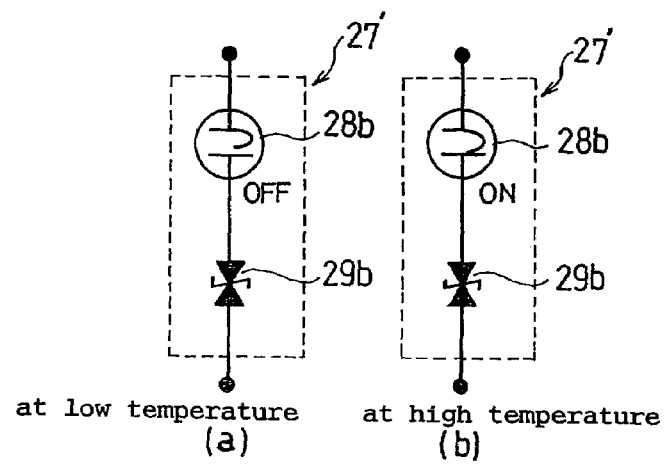
FIG. 7 has circuit diagrams showing the states of the VRS element of FIG. 6 at low temperature (a) and high temperature (b).

FIG. 6 is an enlarged view of the main part of the metal halide lamp 20 of FIG. 2, in which the heat sensitive switching element 28 is a temperature sensitive lead switch 28b and the starting-voltage reducing element 29 is a surge absorber element 29b. The temperature sensitive lead switch 28b and the surge absorber element 29b are connected in series via a connection lead 27c'. In the same manner as in FIG. 4, one terminal of the surge absorber element 29b is connected to the stem lead 24 via the connection lead 27a, and the joint of the connection lead 27a and the stem lead 24 constitutes a fixed terminal A. In FIG. 6, the fixed terminal A is also positioned on a part of the stem lead 24 near the stem glass 23, but the position of the fixed terminal A is not to be limited thereto.

One terminal of the temperature sensitive lead switch 28b is connected to the stem lead 25 via a connection lead 27b, and the joint of the connection lead 27b and the stem lead 25 constitutes a fixed terminal C. That is, geometrically a VRS element 27' is always connected in parallel to the arc tube 1, but the electric connection between the surge absorber element 29b and the stem lead 25 is dependent on the behavior of the temperature sensitive lead switch 28b.

For example, under a low temperature condition of less than 100° C., the temperature sensitive lead switch 28b is turned off, i.e., the electrical connection between the surge absorber element 29b and the stem lead 25 is intercepted (OFF). FIG. 7(a) shows a circuit diagram of the VRS element 27' in such a state. If the temperature of the temperature sensitive lead switch 28b rises to 100° C. or higher, the temperature sensitive lead switch 28b is turned on, so that the electrical connection between the surge absorber element 29b and the stem lead 25 is established (ON). FIG. 7(b) shows a circuit diagram of the VRS element 27' in such a state. Therefore, during the period from the failure of the metal halide lamp 20 to the restart of the metal halide lamp 20, the VRS element 27' using the temperature sensitive lead switch 28b operates in the same manner as the VRS element 27 using the bimetal element 28a. Of course, the connecting positions of the temperature sensitive lead switch 28b and the surge absorber element 29b may be reversed.

In such constructions as in FIGS. 4 to 7, it is clear that as the starting-voltage reducing element 29, the surge absorber element 29b that becomes short-circuited at high voltage that is equal to or higher than a predetermined value can be used in place of the ceramic capacitor 29a, and conversely, that the ceramic capacitor 29a can be used in place of the surge absorber element 29b. The surge absorber element 29b is roughly classified into a semiconductor type and a discharge type. In the present invention, even the use of either type produces essentially the same effects.

The VRS elements 27 and 27' alike function effectively even when the voltage applied to start the metal halide lamp 20 is a high-frequency voltage or an intermittent pulse voltage. Also, the waveform of the high-frequency voltage is not to be particularly limited, and various waveforms such as a rectangular wave or a sinusoidal wave can be used. Further, it is also possible to superimpose a high-frequency voltage on a pulse voltage for application.

The present invention is described more specifically below by way of Examples and Comparative Example.

COMPARATIVE EXAMPLE 1

(a) Production of 150 W Metal Halide Lamp

The arc tube 1 for a 150 W metal halide lamp was produced. A PCA material was used as the material of the arc tube 1. The resultant arc tube 1 (PCA tube) was long and narrow, with the distance Le between the electrodes 6 and 7 being 32 mm, the internal diameter $\phi i$ of the central tubular part 3 being 4 mm, and the tubular shape parameter Le/$\phi i$ being 8. The discharge space 19 of the arc tube 1 contained 9 mg of praseodymium iodide ($PrI_3$) and sodium iodide (NaI) (composition ratio: NaI/$PrI_3$=10), which served as the light emitting substances 17, and 0.7 mg of the mercury 18. Also, xenon was sealed therein at a pressure of about 25 kPa.

Using this arc tube 1, the 150 W metal halide lamp 20 as illustrated in FIG. 2 was fabricated. However, the voltage reducing switching element 27 was not mounted.

(b) Experiment 1

A life test was performed by applying a rectangular wave voltage with a frequency of 150 Hz to the arc tube 1 by means of an electronic ballast. When the metal halide lamp 20 was not in operation, for example, before being started, a high-frequency starting voltage of about 5 kV with a frequency of about 100 kHz was applied for about 50 msec per second (50 msec ON/950 msec OFF) until the metal halide lamp 20 was started.

During the life test, an arc discharge occurred in the outer tubular bulb 21. The arc discharge occurred particularly between the stem leads 24 and 25 near the stem glass 23 of the outer tubular bulb 21. However, the occurrence of an arc discharge in the outer tubular bulb 21 was limited only to conditions where the gas pressure inside the outer tubular bulb 21 exceeded 1 Pa. Also, the occurrence of an arc discharge was found only when the starting voltage was reapplied to the arc tube 1 of high temperature after the failure of the metal halide lamp 20 during lamp operation.

On the other hand, in conditions where the outer tubular bulb 21 was exhausted to a high degree of vacuum, an arc discharge did not occur in the outer tubular bulb 21. Further, even in conditions where the gas pressure inside the outer tubular bulb 21 exceeded 1 Pa, if the temperature of the arc tube 1 was less than 100° C., application of the starting voltage did not result in occurrence of an arc discharge in the outer tubular bulb 21.

EXAMPLE 1

(a) Production of 150 W Metal Halide Lamp

The metal halide lamp 20 was produced in the same manner as in Comparative Example 1, except that the VRS element 27 was mounted as illustrated in FIG. 4. The VRS element 27 used in this example comprised the bimetal element 28a and the ceramic capacitor 29a that were connected in series. The capacity of the ceramic capacitor 29a was set to about 3,500 pF. Also, the bimetal element 28a used was configured such that it was turned on at 100° C. or higher and turned off below 100° C. This VRS element 27 is capable of reducing the high-frequency starting voltage from the normal value of about 5 kV down to a level of about 1 kV or less at which an arc discharge in the outer tubular bulb 21 can be prevented from occurring.

The resultant metal halide lamp 20 exhibited excellent lamp characteristics suitable for outdoor lighting applications, with the initial luminous flux being 19,700 lm, the lamp efficiency 131.3 lm/W, and the color rendering index Ra 70.

(b) Experiment 2

A life test was performed in the same manner as in Comparative Example 1.

Immediately after the failure of the metal halide lamp 20, the bimetal element 28a had a high temperature of about 400° C., so that the movable terminal B of the VRS element 27 was connected to the stem lead 25. Thus, due to the function of the ceramic capacitor 29a of the VRS element 27 connected in parallel to the arc tube 1, the high-frequency starting voltage was reduced from the normal value to about 1 kV. Accordingly, upon the failure of the metal halide lamp 20 due to increased gas pressure inside the outer tubular bulb 21, the starting voltage was prevented from being applied to the arc tube 1 of high temperature without being reduced, so that an arc discharge did not occur in the outer tubular bulb 21.

About 8 minutes after the failure of the metal halide lamp 20, the temperature of the bimetal element 28a lowered to about 100° C., so that the movable terminal B of the VRS element 27 was disconnected from the stem lead 25. As a result, the normal high-frequency starting voltage was applied to the arc tube 1 without being reduced, so that the metal halide lamp 20 was promptly restarted. At this time, since the temperature of the arc tube 1 was sufficiently low, occurrence of an arc discharge in the outer tubular bulb 21 was not observed.

As described above, during the life test, no arc discharge was observed in the outer tubular bulb 21, and the rated life time was as long as 12,000 hours.

EXAMPLE 2

(a) Production of 150 W Metal Halide Lamp

The metal halide lamp 20 was produced in the same manner as in Comparative Example 1, except that the VRS element 27' was mounted as illustrated in FIG. 6. However, instead of the surge absorber element, the ceramic capacitor 29a was used. Specifically, the VRS element used in this example comprised the temperature sensitive lead switch 28b and the ceramic capacitor 29a that were connected in series. The capacity of the ceramic capacitor 29a was set to about 3500 pF. Also, the temperature sensitive lead switch 28b used was configured such that it was turned on at 100° C. or higher and turned off below 100° C. This VRS element 27' is also capable of reducing the high-frequency starting voltage from the normal value of about 5 kV down to a level of about 1 kV or less at which an arc discharge in the outer tubular bulb 21 can be prevented from occurring. The initial characteristics of the resultant metal halide lamp 20 were the same as those of Example 1.

(b) Experiment 3

A life test was performed in the same manner as in Comparative Example 1.

Immediately after the failure of the metal halide lamp 20, the temperature sensitive lead switch 28b had a high temperature of about 400° C. Therefore, the temperature sensitive lead switch 28b was turned on, and the ceramic capacitor 29a functioned so that the high-frequency starting voltage was reduced from the normal value to about 1 kV. Accordingly, upon the failure of the metal halide lamp 20 due to increased gas pressure inside the outer tubular bulb 21, the starting voltage was prevented from being applied to the arc tube 1 of high temperature without being reduced, so that an arc discharge did not occur in the outer tubular bulb 21.

About 8 minutes after the failure of the metal halide lamp 20, the temperature of the temperature sensitive lead switch 28b lowered to about 100° C., so that the temperature sensitive lead switch 28b was turned off. As a result, the normal high-frequency starting voltage was applied to the arc tube 1 without being reduced, so that the metal halide lamp 20 was promptly restarted. At this time, since the temperature of the arc tube 1 was sufficiently low, occurrence of an arc discharge in the outer tubular bulb 21 was not observed.

As described above, during the life test, no an arc discharge was observed in the outer tubular bulb 21, and the rated life time was almost the same as that in Example 1.

Thereafter, about 7 kPa air was forced into each of the outer tubular bulbs 21 of the metal halide lamps 20 of Examples 1 and 2. Then, when the metal halide lamp 20 failed, it was forcedly restarted, to perform a forced life test. In this test, no arc discharge was also observed in the outer tubular bulb 21.

INDUSTRIAL APPLICABILITY

As described above, according to the present invention, in a metal halide lamp that is started by applying a high starting voltage to an arc tube contained in an outer tubular bulb whose inner space is exhausted to a vacuum, an arc discharge in the outer tubular bulb is prevented from occurring in a lamp life test. It is therefore possible to provide a metal halide lamp with high quality and high efficiency. The present invention is preferably applicable particularly to a metal halide lamp having an arc tube made of a PCA material or quartz, but it is also applicable to various high pressure discharge lamps other than the metal halide lamp.

The invention claimed is:

1. A high pressure discharge lamp comprising:
   an outer tubular bulb whose inner space is exhausted to a vacuum;
   an arc tube contained in said outer tubular bulb; and
   a voltage reducing switching element for reducing a voltage applied to said arc tube, said voltage reducing switching element comprising a heat sensitive switching element and a starting-voltage reducing element which are connected in series,
   wherein during a period in which said heat sensitive switching element has a predetermined temperature or higher, said heat sensitive switching element is closed to electrically connect said arc tube and said voltage reducing switching element in parallel, so that said starting-voltage reducing element is operated, and
   during a period in which said heat sensitive switching element has a temperature lower than the predetermined temperature, said heat sensitive switching element is opened so that said starting-voltage reducing element is not operated.

2. The high pressure discharge lamp in accordance with claim 1, wherein said arc tube is fixed in said outer tubular bulb by a first lead and a second lead which supply the voltage applied to said arc tube, and said voltage reducing switching element is fixed to at least one of said first lead and said second lead.

3. The high pressure discharge lamp in accordance with claim 1, wherein said heat sensitive switching element comprises a bimetal element.

4. The high pressure discharge lamp in accordance with claim 1, wherein said heat sensitive switching element comprises a temperature sensitive lead switch that is turned on at a temperature equal to or higher than said predetermined temperature.

5. The high pressure discharge lamp in accordance with claim 1, wherein said starting-voltage reducing element comprises a capacitor.

6. The high pressure discharge lamp in accordance with claim 1, wherein said starting-voltage reducing element comprises a surge absorber element.

* * * * *